(12) United States Patent
Park

(10) Patent No.: US 7,020,179 B2
(45) Date of Patent: Mar. 28, 2006

(54) BASE STATION TRANSMITTER IN CDMA SYSTEM

(75) Inventor: Won Hyoung Park, Sungnam (KR)

(73) Assignee: LG Electronics Inc., Seoul (KR)

( * ) Notice: Subject to any disclaimer, the term of this patent is extended or adjusted under 35 U.S.C. 154(b) by 814 days.

(21) Appl. No.: 09/801,000

(22) Filed: Mar. 8, 2001

(65) Prior Publication Data
US 2001/0046254 A1 Nov. 29, 2001

(30) Foreign Application Priority Data
Mar. 8, 2000 (KR) .............................. 2000/11546

(51) Int. Cl.
*H04B 15/00* (2006.01)
*H04K 1/00* (2006.01)
*H04L 27/00* (2006.01)

(52) U.S. Cl. ...................... 375/146; 375/255; 375/295; 370/335; 370/342

(58) Field of Classification Search ................ 375/130, 375/140, 141, 146, 225, 279, 280, 281, 295, 375/308, 285, 296, 284; 370/320, 335, 342, 370/441, 545, 536, 542, 544
See application file for complete search history.

(56) References Cited

U.S. PATENT DOCUMENTS 5,471,497 A * 11/1995 Zehavi ........................ 375/142
6,078,576 A * 6/2000 Schilling et al. ............ 370/347
6,282,184 B1 * 8/2001 Lehman et al. ............. 370/342
6,286,994 B1 * 9/2001 Boesel et al. ................ 374/146
6,415,153 B1 * 7/2002 Liew .......................... 455/453
6,553,018 B1 * 4/2003 Ichihara ...................... 370/342
6,628,667 B1 * 9/2003 Murai et al. ................ 370/468

* cited by examiner

*Primary Examiner*—Jean B. Corrielus
(74) *Attorney, Agent, or Firm*—Fleshner & Kim, LLP

(57) ABSTRACT

There is provided a base station transmitter in a CDMA system, comprising: a base station modem for direct-spectrum spreading PCM data to an I-channel and Q-channel; a digital combiner for summing up the spectrum-spread CDMA signals by sectors; a digital signal processor for making the data rate of the digital base-band CDMA signals outputted from the digital combiner twice; and an RF processor for converting the digital base-band CDMA signals outputted from the digital signal processor into analog RF CDMA signals, in which the digital signal processor includes first and second serial-to-parallel converters for converting the CDMA signals outputted from the digital combiner into parallel signals, first and second phase equalizers for compensating the phases of the converted parallel digital CDMA signals, and third and fourth FIR filters for filtering the digital CDMA signals whose phases were compensated with a predetermined sampling frequency to make the digital CDMA signals have the data rate twice that of the signals inputted thereto.

11 Claims, 4 Drawing Sheets

BASE STATION TRANSMITTER IN CDMA SYSTEM

BACKGROUND OF THE INVENTION

1. Field of the Invention

The present invention relates to a CDMA system and, more particularly, to a base station transmitter in a CDMA system.

2. Description of the Related Art

FIG. 1 is a block diagram of a conventional base station transmitter in a CDMA system. Referring to FIG. 1, the conventional base station transmitter in a CDMA system includes a plurality of base station modems 100 for direct-spectrum-spreading PCM data, a digital combiner 110 for summing up CDMA signals outputted from the base station modems 100 by channels (I, Q), an IF processor 120 for converting base-band CDMA signals outputted from the digital combiner 110 into intermediate frequency (IF) signals, and an RF processor 130 for converting the IF CDMA signals into radio frequency (RF) signals, amplifying the RF signals and sending them to an antenna.

The base station modems 100 includes a Walsh generator 101 for multiplying a CDMA signal by Walsh code, first and second multipliers 102 and 103 for multiplying the CDMA signals outputted from the Walsh generator 101 by PN (Pseudo Noise) codes PN-1 and PN-Q1, respectively, to direct-spectrum-spread the CDMA signals, and first and second finite impulse response (FIR) filters 104 and 105 for filtering the spectrum-spread CDMA signals. The digital combiner 110 consists of first and second adders 111 and 112 for adding up the CDMA signals spectrum-spread by the digital combiner 110 by sectors. Here, the CDMA signals are transmitted in 14-bit serial bit streams.

The base band/IF signal processor 120 includes first and second serial-to-parallel converters (not shown) for converting the digital CDMA signals into parallel signals, first and second D/A converters 121 and 122 for converting the parallel CDMA signals into analog CDMA signals, first and second phase equalizers/low pass filters 123 and 124 for compensating the phases of the analog CDMA signals and removing unnecessary signal components from the signals, first and second mixers 125 and 126 for multiplying the CDMA signals whose phases were compensated by carrier signals to convert them into IF CDMA signals, and a third adder 127 for adding up the IF CDMA signals and QPSK (quadrature phase shift keying)-modulating the signal. Here, the carrier signals are $\cos(2\pi f_{IF} t)$ and $\sin(2\pi f_{IF} t)$.

The RF processor 130 includes a third mixer 131 for mixing the base band CDMA signal QPSK-modulated by the base band/IF signal processor 120 with a local oscillation signal $SP_{RF}$, to convert it into an RF CDMA signal, a band pass filter 133 for eliminating the spurious component of the RF CDMA signal, and an amplifier 134 for amplifying the output of the band pass filter 133 and sending it to the antenna.

The operation of the conventional base station transmitter of a CDMA system constructed as above is described below with reference to the attached drawing.

When PCM data having a predetermined data rate is inputted from a vocoder (not shown), the CDMA base station 100 direct-spectrum-spreads the PCM data into digital base band CDMA signals of 1.2288 Mcps by sectors and sends them to the digital combiner 110 through I-channel (In-phase channel) and Q-channel (Quadrature channel). This operation is respectively performed for the plurality of CDMA base stations.

The digital combiner 110 sums up the digital base-band CDMA signals outputted from the base station modem 100 by the sectors. That is, the digital combiner 110 sums up CDMA signals received from the plurality of base station modems 100 by the sectors, and then sends them to the IF processor 120 in the form of serial bit stream. The IF processor 120 converts the digital CDMA signals received from the digital combiner 110 into IF CDMA signals, respectively sums up the IF CDMA signals of the I-channel and Q-channel, and QPSK-modulates them.

Specifically, the first and second serial-to-parallel converters of the IF processor 120 respectively convert the base-band digital CDMA signals respectively received through the I-channel and Q-channel into parallel CDMA signals, and the first and second D/A converters 121 and 122 thereof respectively convert the parallel CDMA signals into analog CDMA signals. In addition, the first and second phase equalizers/low pass filters 123 and 124 compensate the phases of the analog CDMA signals and remove unnecessary components from the signals, and the first and second mixers 125 and 126 mix the analog CDMA signals whose phases are compensated with carrier signals to convert the base-band CDMA signals into IF CDMA signals. The third adder 127 adds up the analog IF CDMA signals received from the first and second mixers 125 and 126 to output the QPSK-modulated CDMA signal.

The third mixer 131 of the RF processor 130 mixes the QPSK-modulated CDMA signal with the local oscillation signal $LO_{RF}$ to convert it into an analog RF CDMA signal, and the band pass filter 133 removes the spurious component from the RF CDMA signal, and then sends it through the amplifier 134.

However, the conventional base station transmitter has the following problems.

First of all, there is a high possibility that noise components may be added on the analog path following the first and second D/A converters because the IF processor converts the digital CDMA signals sent from the CDMA modem into the analog CDMA signals. This affects the forward capacity of the system seriously to result in deterioration of speech quality in case of lots of traffic. Furthermore, it is difficult to improve characteristics of the CDMA signals because of the low pass filter and band pass filter. Moreover, to improve signal characteristic through the low pass filter in the conventional base station transmitter requires linearity of phase characteristic as well as the cut-off characteristic of the filter. However, currently used analog low pass filters cannot satisfy the phase characteristic and they occupy large areas and consume lots of power.

In addition, the conventional base station transmitter converts the analog CDMA signals into IF CDMA signals, and then converts them into the RF CDMA signals. For this, a surface acoustic wave (SAW) filter for processing the RF signals is generally connected to the output port of the third adder, and the mixer must be used for converting the IF signals into the RF signals. Accordingly, the conventional base station transmitter needs additional devices for converting the IF signals into the RF signals, resulting in an increase in the manufacturing cost of the system.

SUMMARY OF THE INVENTION

It is, therefore, an object of the present invention to provide a base station transmitter in a CDMA system, capable of directly converting base-band CDMA signals into RF CDMA signals.

To accomplish the object of the present invention, there is provided a base station transmitter in a CDMA system, comprising: a base station modem for direct-spectrum spreading PCM data to an I-channel and Q-channel; a digital combiner for summing up the spectrum-spread CDMA signals by sectors; a digital signal processor for making the data rate of the digital base-band CDMA signals outputted from the digital combiner twice; and an RF processor for converting the digital base-band CDMA signals outputted from the digital signal processor into analog RF CDMA signals.

DETAILED DESCRIPTION OF THE PREFERRED EMBODIMENT

Reference will now be made in detail to the preferred embodiments of the present invention, examples of which are illustrated in the accompanying drawings.

Figure 1:
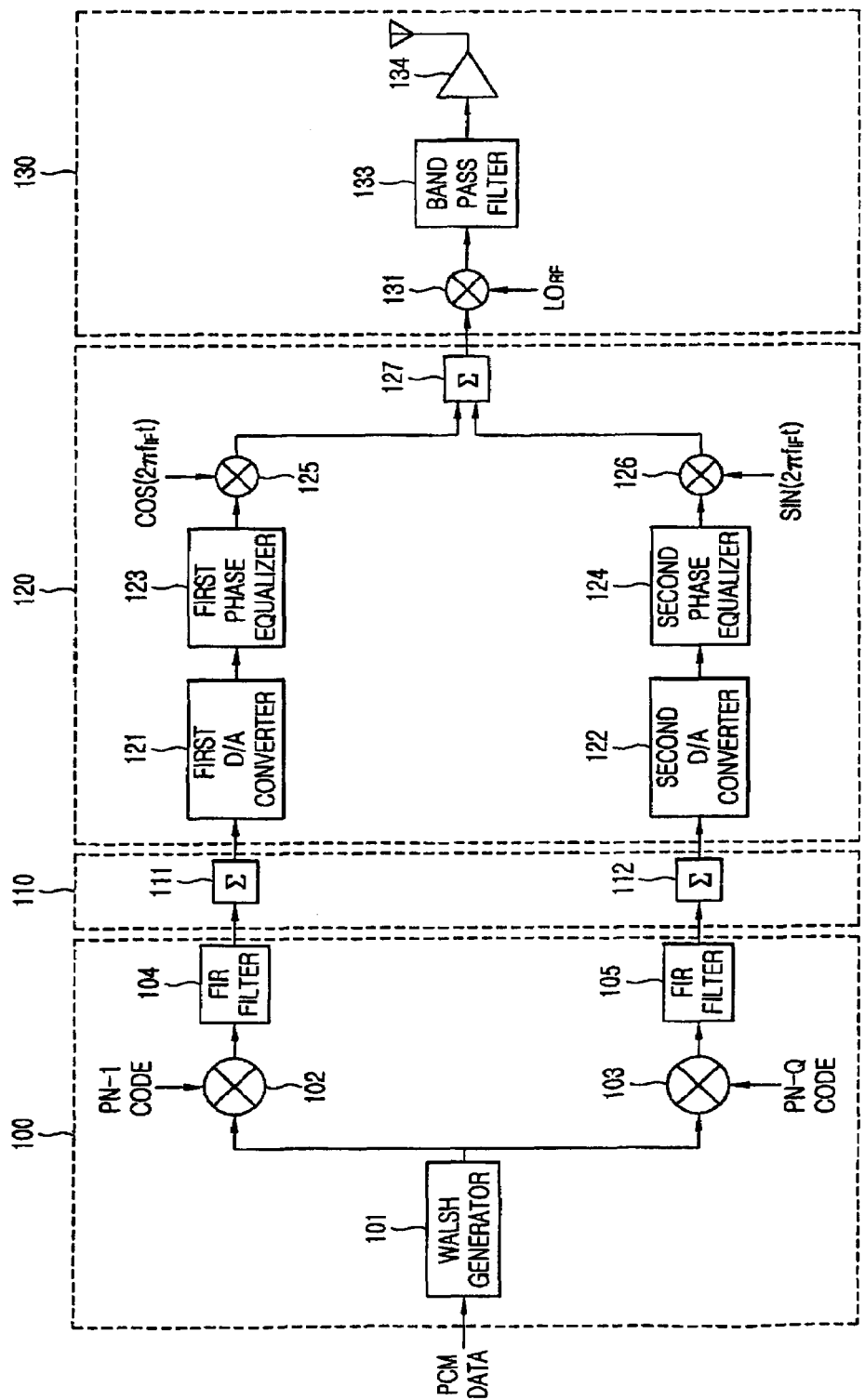
FIG. 1 is a block diagram of a conventional base station transmitter in a CDMA system.
Figure 2:
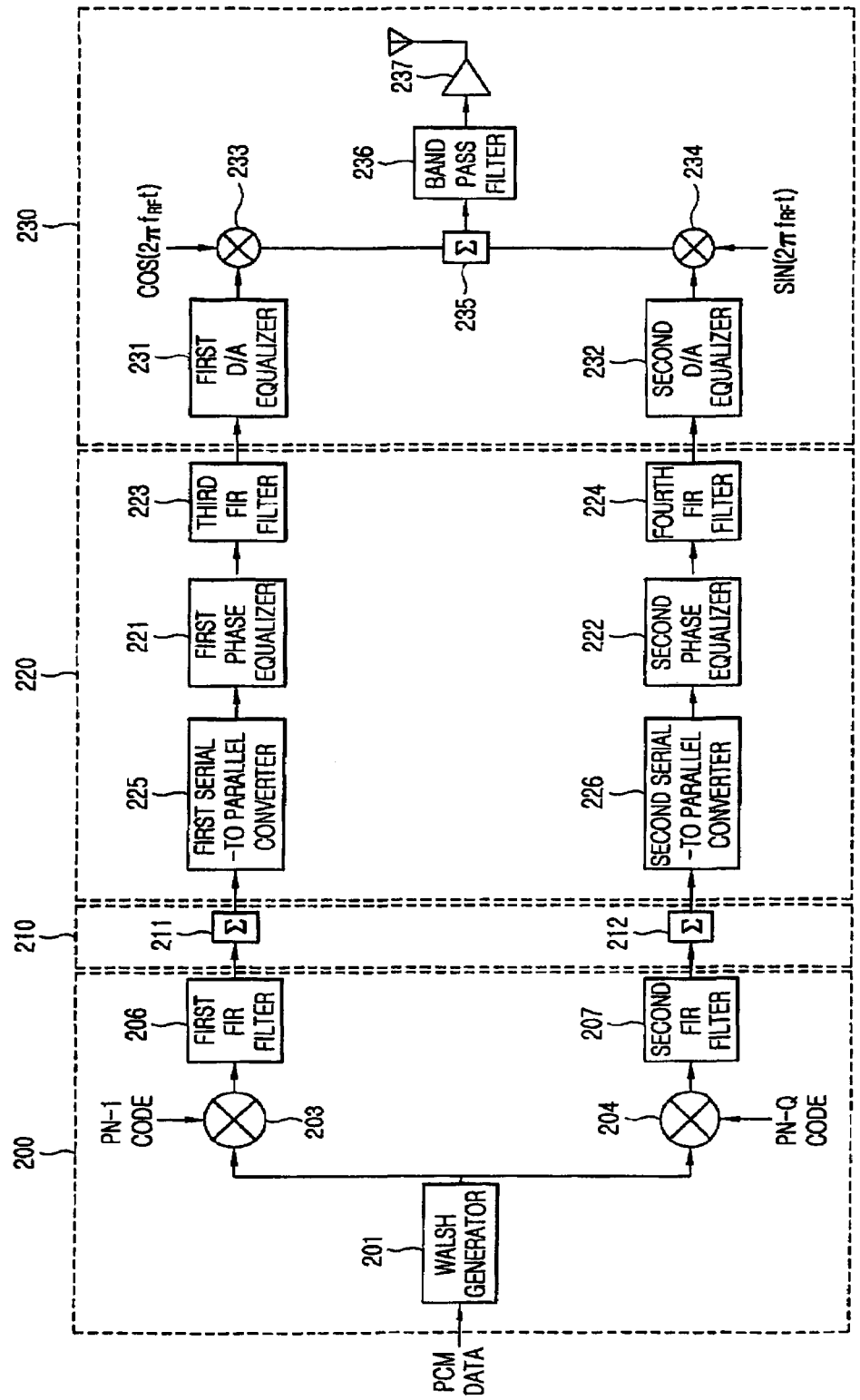
FIG. 2 is a block diagram of a base station transmitter in a CDMA system according to the present invention.

FIG. 2 is a block diagram of a base station transmitter in a CDMA system according to the present invention. Referring to FIG. 2, the base station transmitter includes a base station modem 200 for direct-spectrum-spreading PCM data into the I-channel and Q-channel, a digital combiner 210 for summing up the spectrum-spread digital CDMA signals by the channels, a digital signal processor 220 for compensating the phases of the digital CDMA signals received from the digital combiner 210 and FIR(finite impulse response)-filtering them, and an RF processor 230 for converting the digital base-band CDMA signals outputted from the digital signal processor 220 into analog RF CDMA signals. The base station modem 200 and digital combiner 210 have the same configurations as those of the conventional ones.

The digital signal processor 220 includes first and second serial-to-parallel converters 225 and 226 for converting the CDMA signals outputted from the digital combiner 210 into parallel signals, first and second phase equalizers 221 and 222 for compensating the phases of the CDMA signals outputted from the first and second serial-to-parallel converters, and third and fourth FIR filters 223 and 224 for filtering the digital DCMA signals whose phases were compensated with a predetermined sampling frequency (4.9152 Mhz) and outputting digital base-band CDMA signals each of which has a data rate twice that of the digital CDMA signal inputted to each FIR filter. Here, each of the first and second phase equalizers 221 and 222 is configured to an IIR (infinite impulse response) filter, and each of the third and fourth FIR filters 223 and 224 is configured to an FIR filter having the equal ripple shape.

The RF processor 230 includes first and second D/A converters 231 and 232 for converting the digital CDMA signals received from the digital signal processor 220 into analog CDMA signals, first and second mixers 233 and 234 for mixing the analog CDMA signals outputted from the first and second D/A converters 231, 232 with RF signals to output RF CDMA signals, a third adder 235 for adding up the RF CDMA signals received from the first and second mixers 233 and 234 to generate a QPSK-modulated CDMA signal, a band pass filter 236 for eliminating the spurious component of the QPSK-modulated CDMA signal outputted from the third adder 235, and an amplifier 237 for amplifying the output of the band pass filter 236 and sending the amplified signal to an antenna.

The operation of the base station transmitter of a CDMA system constructed as above according to the present invention is described below with reference to the attached drawings.

The CDMA base station 200 direct-spectrum-spreads a CDMA signal having a predetermined rate, outputted from a vocoder (not shown) into digital base-band signals of 1.2288 Mcps by sectors (I,Q) a sends them to the digital combiner 210 through the I-channel and Q-channel. The digital combiner 210 sums up the CDMA signals outputted from the plural base station modems by the sectors, and transmits them to the digital signal processor 220 in the form of serial bit stream. First and second SPCs 225 and 226 of the digital signals processor 220 converts the base-band CDMA signals outputted from the digital combiner 210, that is, serial data bit streams each of which has the data rate of 19.608 Msps into parallel data having the data rate of 2.4576 Msps.

Figure 5:
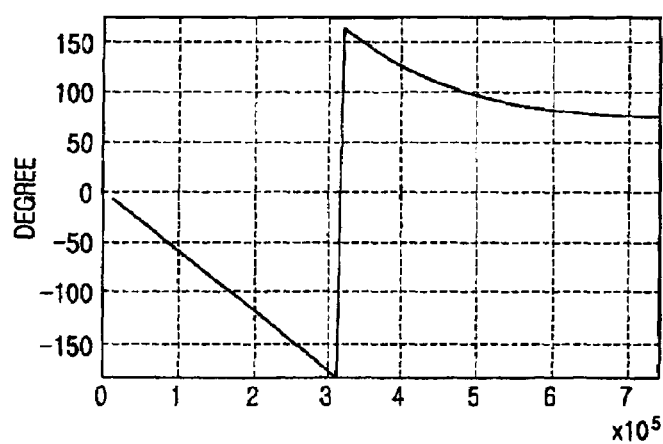
FIG. 5 is a graph illustrating the phase characteristic of the IIR filters of FIG. 2

The first and second phase equalizers 221 and 222 compensate the phases of the CDMA signals converted by the first and second SPCs using phase characteristic of an IIR filter shown in FIG. 5, to satisfy the phase specification of a base station transmission signal represented by the following expression.

$$Hpe(\omega)=K(\omega^2+js\alpha s\omega s\omega_0+\omega_0^2)/(\omega^2-js\alpha s\omega s\omega_0-\omega_0^2) \quad (1)$$

where K indicates an arbitrary gain, ω corresponds to 1.36, and $\omega_0$ is $2\pi \times 3.15 \times 10^5$.

The third and fourth filters 223 and 224 low-pass-filter the digital CDMA signals serially transmitted from the first and second phase equalizers 221 and 222, that is, the parallel data having the data rate of 2.4576 Msps, with the sampling frequency of 4.9152 MHz, to output a base-band CDMA signal having the data rate twice that of the parallel data. Consequently, the FIR-filtering has the same result as the result obtained by performing interpolation twice.

Figure 3:
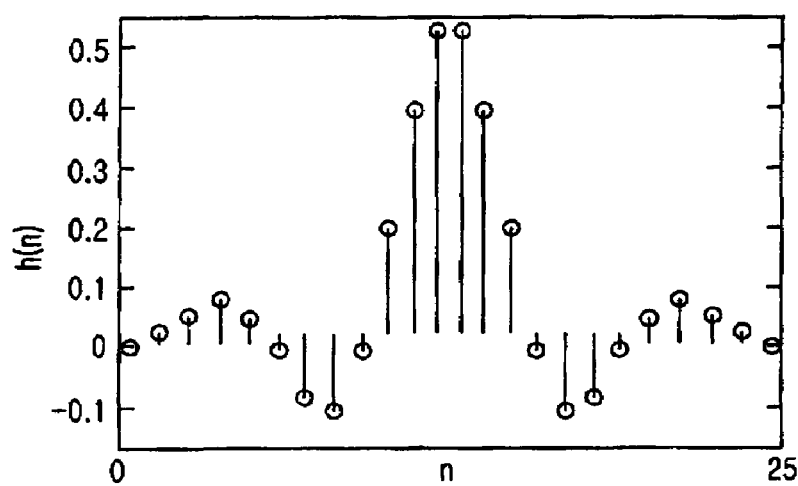
FIG. 3 is a graph illustrating the impulse response curve of the third and fourth FIR filters of FIG. 2.
Figure 4:
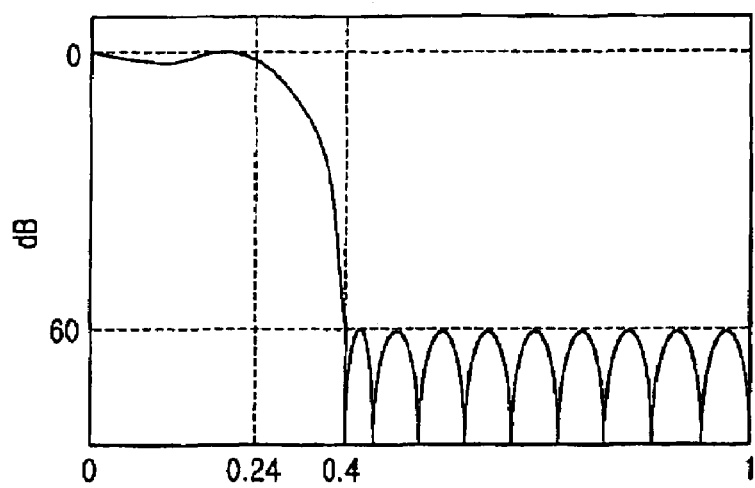
FIG. 4 is a graph illustrating the frequency response curve of the third and fourth FIR filters of FIG. 2.

FIGS. 3 and 4 illustrate the impulse response and frequency response of the third and fourth FIR filters 223 and 224. As shown in FIGS. 3 and 4, each of the third and fourth FIR filters 223 and 224 is configured of a low pass filter having a total of 26 taps, that is less than that of the taps of an FIR filter, defined by IS-95, by 22. Here, the maximum frequency of the passband is 590 Khz and the ripple thereof is 1.5 dB. The minimum frequency of the support band is 980 Khz and the maximum attenuation thereof is 60 dB. Accordingly, the image component and frequency component a5re depart from the center of the base-band by 4.9152 Mhz or more by the FIR filtering so that the image component and frequency component can prevent unnecessary signal components from being generated when the signals are converted into analog RF CDMA signals.

The first and second D/A converters 231 and 232 convert the digital CDMA signals outputted from the third and fourth FIR filters 223 and 224 into analog CDMA signals, and the first and second mixers 233 and 234 mix the analog CDMA signals with predetermined carrier signals, respectively, to convert them into RF signals. Here, the carrier signals are $COS(2\pi f_{RF}t)$ and $SIN(2\pi f_{RF}t)$. The third adder 235 adds up the RF CDMA signals to QPSK-modulate it, and the band pass filter 236 eliminates the spurious component from the QPSK-modulated CDMA signal and sends it through the amplifier 237 to the antenna.

As described above, the base station transmitter according to the present invention directly converts the base-band CDMA signals into the RF CDMA signals without passing through the IF conversion procedure. This reduces the manufacturing cost because the base station transmitter of the invention does not require elements for converting IF CDMA signals into RF CDMA signals, such as expensive SAW filter, MMIC, mixer, etc. which were used in the conventional base station transmitter. Furthermore, the base station transmitter of the invention does not need an amplifier for compensating a signal processing loss of the SAW filter since it does not employ the SAW filter, resulting in an increase in the gain of the transmission signal. Moreover, the present invention realizes the phase equalizer/low pass filter used in the conventional base station transmitter for processing analog signals with a single FIR filter to digitally process signals, thereby securing reliability of signal characteristics. In addition, thermal noise, harmonic component and spurious component, generated in signal processing, can be reduced, to improve the performance of the system.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A base station transmitter in a CDMA system, comprising:
   a base station modem for direct-spectrum spreading PCM data to I-channel and Q-channel CDMA signals;
   a digital combiner for summing up the spectrum-spread CDMA signals by channels into digital base-band CDMA signals;
   a digital signal processor for converting the digital base-band CDMA signals into parallel signals with a first data rate and for outputting the parallel signals with a second data rate that is twice a data rate of the first data rate; and an RF processor for converting the digital base-band CDMA signals outputted from the digital signal processor into analog RF CDMA signals;
   wherein the digital signal processor includes:
   first and second serial-to-parallel converters for converting the digital base-band CDMA signals from the digital combiner into parallel signals:
   first and second phase equalizers for compensating phases of the converted parallel digital CDMA signals;
   and first and second FIR filters for filtering the digital CDMA signals whose phases were compensated with a predetermined sampling frequency to make the digital CDMA signals have the second data rate.

2. The base station transmitter in a CDMA system as claimed in claim 1, wherein each of the first and second phase equalizers includes an IIR (Infinite Impulse Response) filter.

3. The base station transmitter in a CDMA system as claimed in claim 1, wherein the RF processor includes:
   first and second D/A converters for converting the CDMA signals from the digital signal processor into analog CDMA signals;
   first and second mixers for mixing the analog CDMA signals from the first and second D/A converters with RF, signals, to output RF CDMA signals; and
   an adder for adding up the RF CDMA signals outputted from the first and second mixers, to generate a QPSK-modulated CDMA signal.

4. The base station transmitter in a CDMA system as claimed in claim 3, wherein the RF processor further includes:
   a band pass filter for removing spurious component from the QPSK-modulated CDMA signal received from the adder; and
   an amplifier for amplifying an output signal of the band pass filter and sending the amplified signal to an antenna.

5. A base station transmitter in a CDMA system, comprising:
   a base station modem for direct-spectrum spreading PCM data to I-channel and Q-channel CDMA signals;
   a digital combiner for summing up the spectrum-spread CDMA signals by channels into digital base-band CDMA signals;
   a digital signal processor for converting the digital base-band CDMA signals into parallel signals with a first data rate and for outputting the parallel signals with a second data rate that is twice a data rate of the first data rate; and
   an RF processor for converting the digital base-band CDMA signals outputted from the digital signal processor into analog RF CDMA signals,
   wherein the digital signal processor includes first and second serial-to-parallel converters for converting the digital CDMA signals from the digital combiner into parallel signals,
   first and second phase equalizers for compensating phases of the converted parallel digital CDMA signals, and
   first and second FIR filters for filtering the digital CDMA signals whose phases were compensated with a predetermined sampling frequency to make the digital CDMA signals have the second data rate.

6. The base station transmitter in a CDMA system as claimed in claim 5, wherein the each of the first and second phase equalizers includes an IIR (Infinite Impulse Response) filter.

7. The base station transmitter in a CDMA system as claimed in claim 5, wherein the RF processor includes:
   first and second D/A converters for converting the digital CDMA signals from the digital signal processor into analog CDMA signals;
   first and second mixers for mixing the analog CDMA signals from the first and second D/A converters with RF signals, to output RF CDMA signals; and
   an adder for adding up the RF CDMA signals from the first and second mixers, to generate a QPSK-modulated CDMA signal.

8. A base station transmitter in a CDMA system comprising:
   a base station modem for direct-spectrum spreading PCM data to I-channel and Q-channel CDMA signals;
   a digital combiner for summing up the spectrum-spread CDMA signals by channels into digital-base-band CDMA signals;
   a digital signal processor for converting the digital base-band CDMA signals into parallel signals with a first data rate and for outputting the parallel signals with a second data rate that is twice a data rate of the first data rate; and
   an RF processor for directly converting the digital base-band CDMA signals outputted from the digital signal processor into analog RF CDMA signals without passing the CDMA base-band signals through an IF conversion procedure;

wherein the digital signal processing includes:

first and second phase equalizers for compensating phases of the converted parallel digital CDMA signals; and first and second FIR filters for filtering the digital CDMA signals whose phases were compensated with a predetermined sampling frequency to make the digital CDMA signals have the second data rate.

9. The base station transmitter in a CDMA system as claimed in claim 8, wherein each of the first and second phase equalizers includes an IIR (Infinite Impulse Response) filter.

10. The base station transmitter in a CDMA system as claimed in claim 8, wherein the RF processor further includes:

first and second D/A converters for converting the CDMA signals from the digital signal processor into analog CDMA signals;

first and second mixers for mixing the analog CDMA signals from the first and second D/A converters with RF signals, to output RF CDMA signals; and an adder for adding up the RF CDMA signals outputted from the first and second mixers, to generate a QPSK-modulated CDMA signal.

11. The base station transmitter in a CDMA system as claimed in claim 10, wherein the RF processor further includes:

a band pass filter for removing spurious component from the QPSK-modulated CDMA signal received from the adder; and an amplifier for amplifying an output signal of the band-pass filter and sending the amplified signal to an antenna.

* * * * *